Nov. 4, 1930. B. A. LINDERMAN 1,780,200
METALLIC SHOE FOR FLUID PRESSURE OPERATED BRAKES
Filed May 15, 1926 5 Sheets-Sheet 4

Inventor
Bert A. Linderman
By Munday, Clarke & Carpenter
Atty's.

Nov. 4, 1930.                B. A. LINDERMAN                1,780,200
              METALLIC SHOE FOR FLUID PRESSURE OPERATED BRAKES
                          Filed May 15, 1926         5 Sheets-Sheet 5
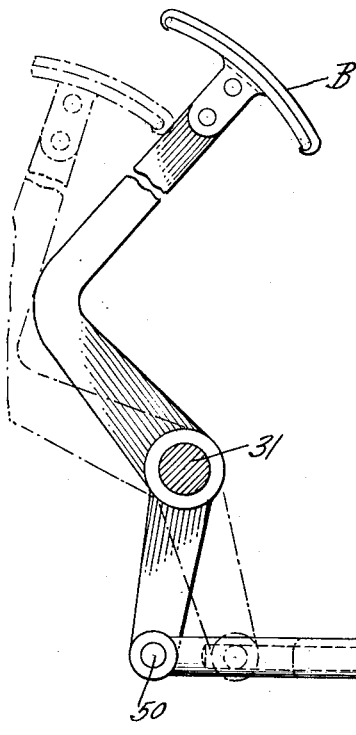
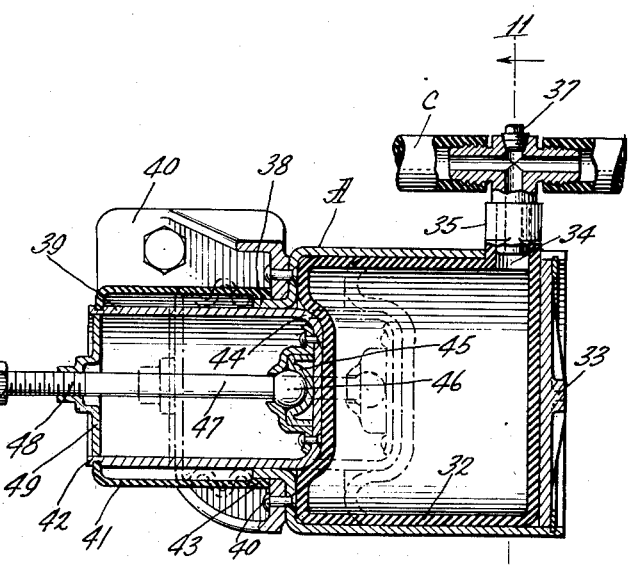
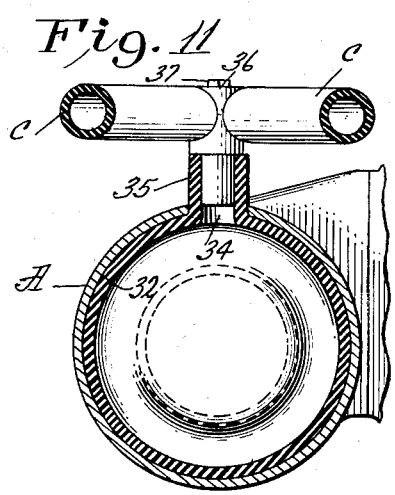
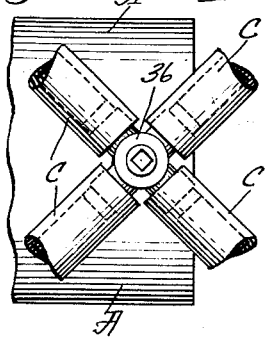
Inventor
Bert A. Linderman
By Munday, Clarke & Carpenter
Atty's.

Patented Nov. 4, 1930

1,780,200

UNITED STATES PATENT OFFICE

BERT A. LINDERMAN, OF NEW YORK, N. Y., ASSIGNOR TO LINDERMAN & COMPANY, OF NEW YORK, N. Y., A CORPORATION OF DELAWARE

METALLIC SHOE FOR FLUID-PRESSURE-OPERATED BRAKES

Application filed May 15, 1926. Serial No. 109,210.

This invention relates to fluid pressure operated brakes for automotive vehicles and in particular refers to an improved type of four wheel brakes for automobiles and for my improved system for operating these brakes.

In general this invention relates to certain improvements in the details of construction shown in my pending application, Serial No. 725,786, filed July 14, 1924, wherein is disclosed my fluid pressure system for operating radially disposed braking segments for four wheeled brakes and wherein is shown and claimed in particular the constructional means for insulating the inflatable tube which actuates these braking segments from the heat of friction generated during the braking operation.

One of the objects of my present invention resides in providing a novel type of brake for automotive vehicles and the like wherein the radially acting brake shoes are composed wholly of metal and are constructed and arranged so as to quickly dissipate any heat generated during the braking operation and to form an insulating means for the rubber inflatable tube which actuates these braking segments.

Another object of my invention resides in providing these braking segments with air ventilating and heat dissipating channels or spaces whereby to prevent the transmission of the heat generated by the braking action to the rubber inflatable tube.

Another object of my invention resides in providing these arcuate braking segments of stamped metal and arranging them in a manner to promote economy in manufacture, in assembly, and in excellence of operation.

Yet another object of my invention resides in the arrangement of the air inflating connections to the inflatable tube and the mounting of the same on the stationary hub of the vehicle in a simple and rigid manner.

Another object of my invention resides in the arrangement and disposition of the interfitting flanges on the rotatable brake drum and stationary wheel hub, which parts carry the cooperating braking members and which flanges are constructed and arranged not only to prevent the access of dirt and dust into the interior of the brake mechanism but also to permit the access of air thereinto to promote cooling of the heated parts caused by braking friction.

Still another object of my invention resides in the constructional arrangement of the master collapsible diaphragm which causes the transmission of fluid pressure to the inflatable tubes actuating the brakes.

And a further feature of this invention resides in the particular constructional features of this master collapsible member and in the connections therefrom to the brake pedal for collapsing the diaphragm, the construction being arranged to eliminate dust and dirt therefrom and at the same time preventing any possible pinching of the rubber master diaphragm during its operation.

Numerous other objects and advantages of the invention will be apparent as it is better understood from the following description, which, taken in connection with the accompanying drawings, discloses a preferred embodiment thereof.

Referring to the drawings,

Fig. 7 is a detailed view of one of the stamped metal braking segments,

Fig. 8 is a view of one of the springs,

Fig. 9 is a view of the pin for holding the spring in position.

Fig. 10 is a sectional view of the master collapsible diaphragm for operating the inflatable tubes, Fig. 11 is a section on line 11—11 of Fig. 10, Fig. 12 is a top view of that portion of the master cylinder which contains the connections leading to the inflatable tubes.

Figure 1:
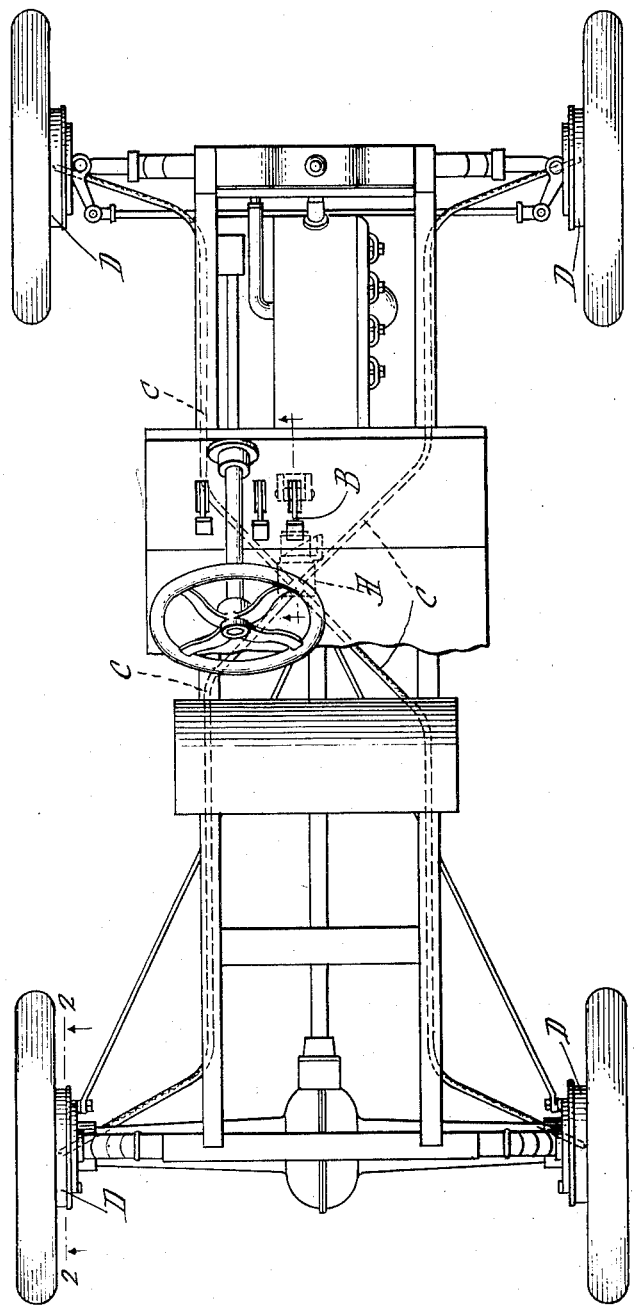
Fig. 1 is a plan view of an automotive vehicle provided with connections from the master diaphragm to the four-wheeled brakes.

Referring now to Fig. 1 of the drawings for a general disclosure of the application of my invention, it will be noted that the automobile is disclosed as provided with four wheeled brakes which are adapted to be actuated from a master collapsible member indicated as at A in Fig. 1 and controlled from the brake pedal B. This master cylinder is provided with four tube like connections C running to each of the brakes which are disclosed at the hubs D of each wheel.

Figure 2:
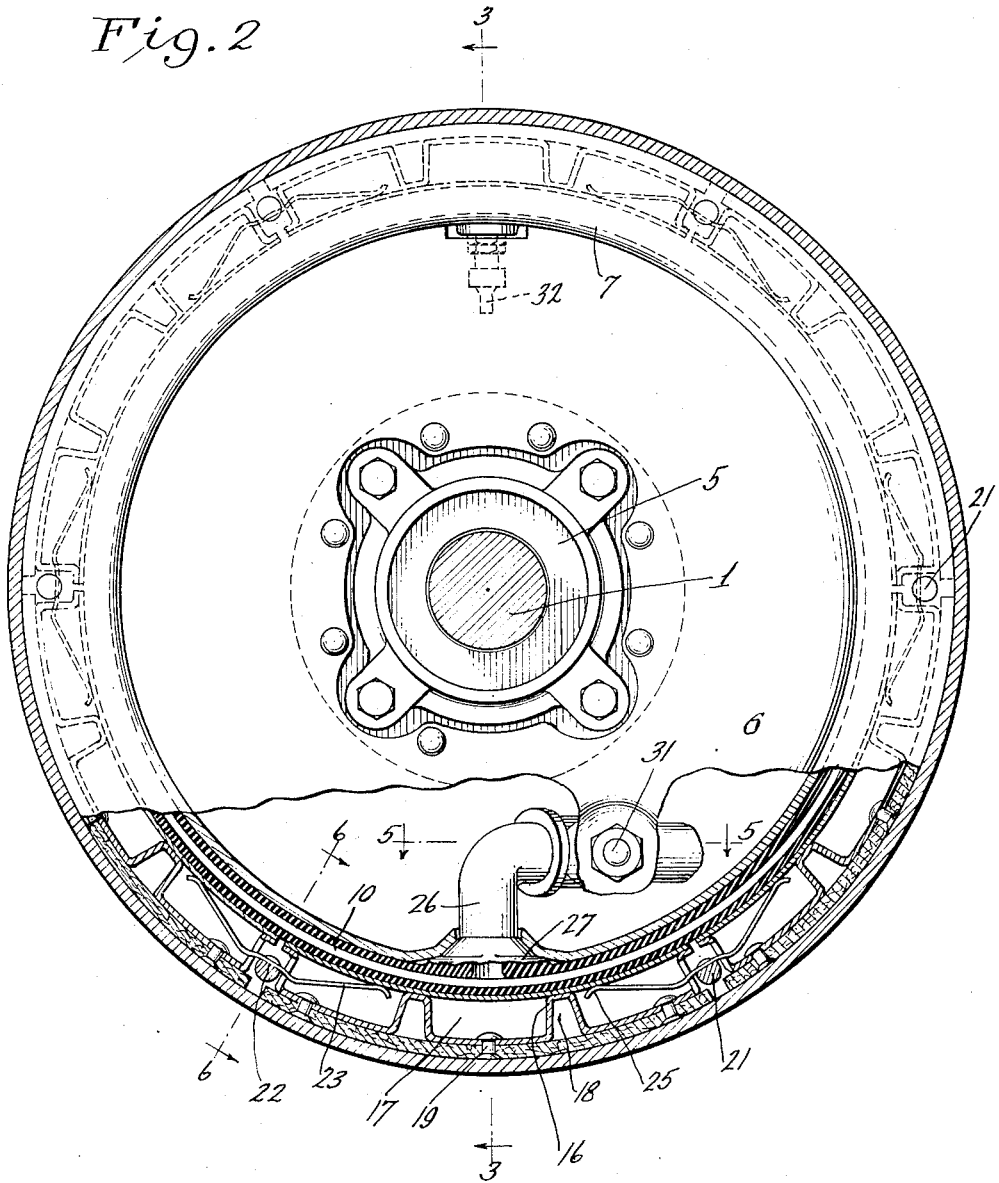
Fig. 2 is a sectional view on line 2—2 of Fig. 1.
Figure 3:
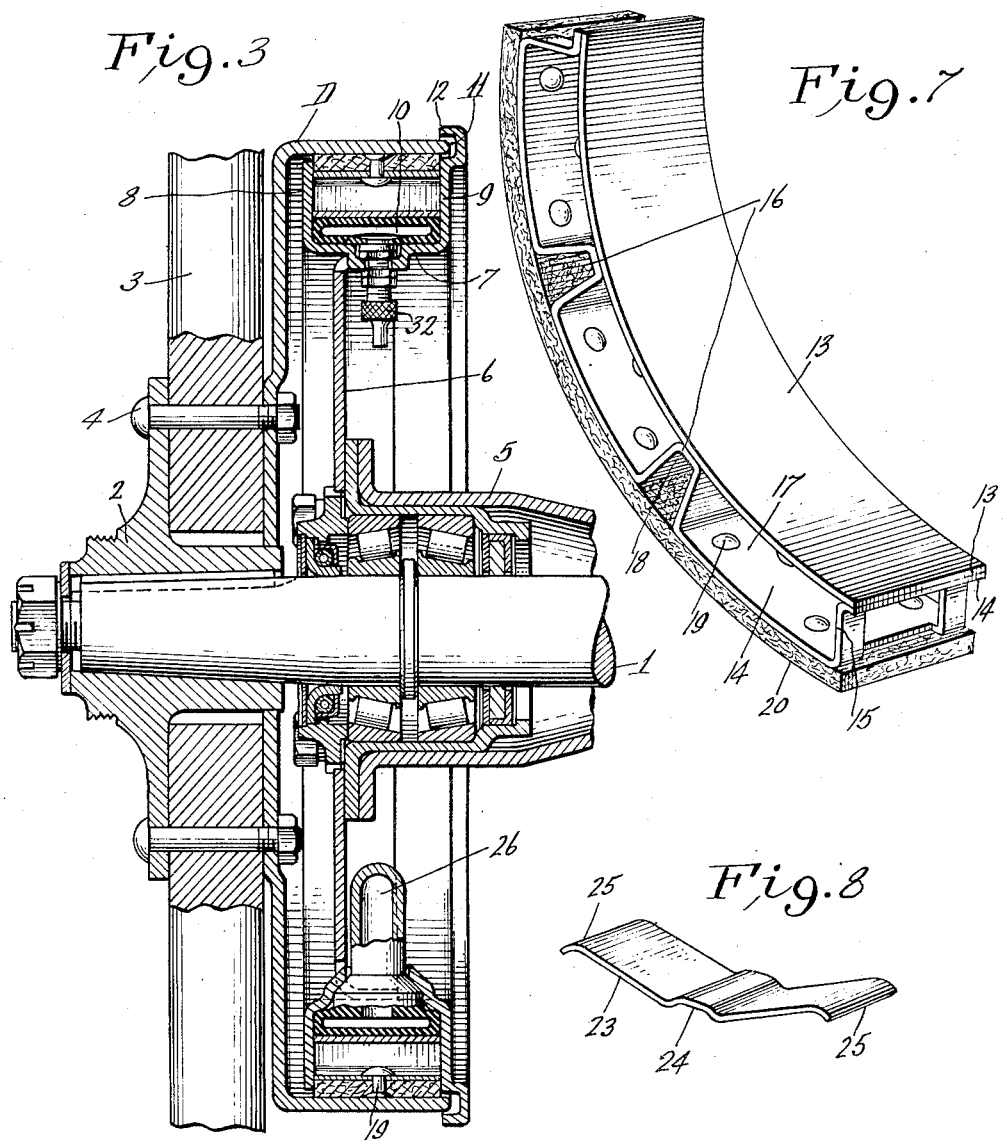
Fig. 3 is a section on line 3—3 of Fig. 2.
Figure 4:
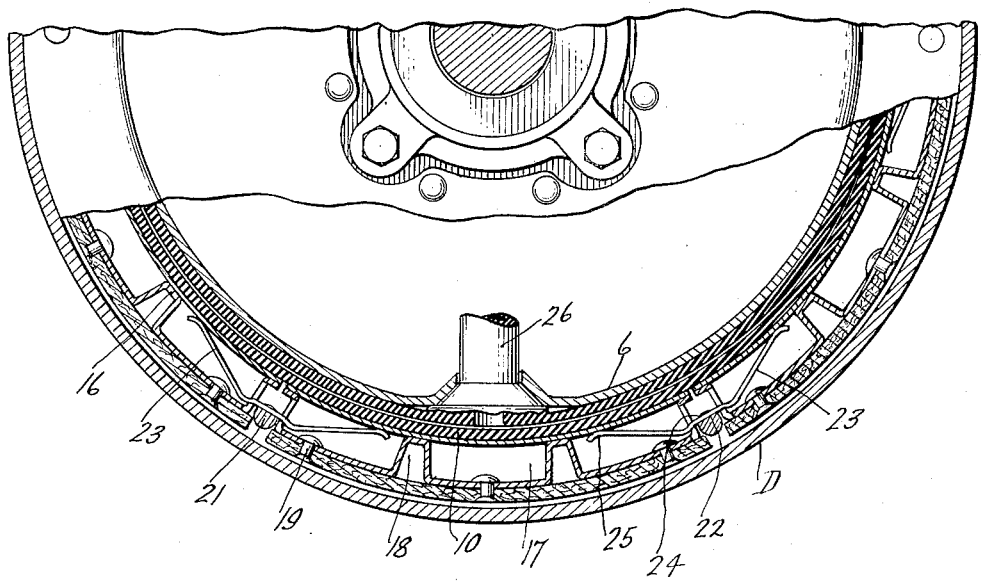
Fig. 4 is a partial side view of Fig. 3.
Figure 5:
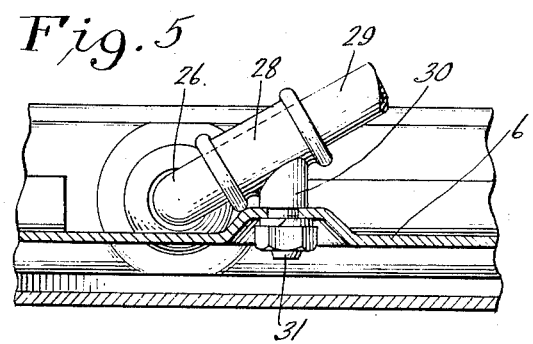
Fig. 5 is a section on line 5—5 of Fig. 2.

Each brake mechanism located at a wheel is constructed substantially as shown in Figs. 2, 3, and 4 of the drawings. In Fig. 3 the wheel axle 1 is provided with the usual hub 2 and spokes 3 to which spokes and hub is bolted, as at 4, an outer brake drum, shown as at D in Fig. 1, so that this brake drum rotates with the wheel 3. To the stationary hub 5 of each wheel is fixed an outwardly extending solid plate 6 to which is suitably fastened an annular channel or substantially deep U-shaped rim 7 having the opposed radial walls 8 and 9 spaced apart to receive an inflatable tube 10 of rubber, rubberized fabric, or non-metallic, resilient material. This space between the walls 8 and 9 of the U-shaped rim is also occupied by the braking segments, one of which is illustrated in detail in Fig. 7 of the drawings. These braking segments are arcuate and when assembled in position in the U-shaped rim form a complete circumferential multisectioned braking band. The extreme outer portion of the wall 9 of the U-shaped rim is provided with an annular recess 11 and a peripheral overhanging lip 12 to receive therein the extreme peripheral edge of the braking drum D. This construction, while preventing the ingress of dirt and dust between the brake drum D and the wall 9, permits circulating currents of air to pass thereinto whereby to cool the inner parts as will be hereinafter made evident.

One of the essential features of my invention resides in constructing the braking segments in a manner so that they possess great durability. At the same time it is most essential that they be constructed and arranged to prevent the transmission of the heat of friction, set up during braking operation, to the rubber inflatable tube 10 against which they lie and by which they are shifted radially outwardly. Without an effective insulating protection the heat of friction set up during braking operation would almost instantly completely burn the rubber inflatable tube 10. One of the features of my present invention resides in providing ruggedness and simplicity of construction and assembly of these braking segments by forming them of stamped metal and arranging them so that they cooperatingly interfit and assemble when disposed concentrically about the rubber 10 within the U-shaped rim 7. As disclosed in detail in Fig. 7 of the drawings, each braking segment comprises an arcuate metal section 13 of predetermined length to which is preferably spot welded or otherwise fastened an outer metal section 14 which is provided with radial lugs or spacing members 15 at its ends and with intermediate inwardly bent bridge members 16 whereby to provide cooling spaces 17 and 18 of great capacity as compared with the cross section of the metal forming the braking segments. The outer metal members 14 have riveted to their outer faces, as at 19, the usual type of brake lining 20 which is also made of length to correspond with the length of the braking segment and which lies adjacent to the brake drum D when in assembled position. It will be noted that the meeting edges of the inner arcuate brake section 13 and the outer section 14 are brought together at each end of the braking section and are adapted to form end pieces of substantial thickness so as to abut the similarly formed portion of the adjacent brake segment when the segments are placed in position, all as illustrated in Fig. 4 of the drawings.

Figure 6:
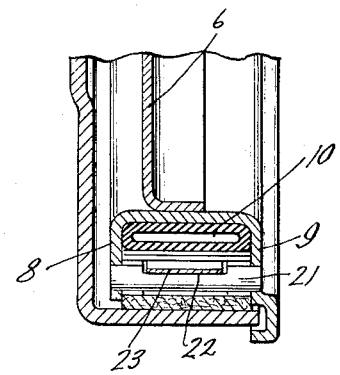
Fig. 6 is a section on line 6—6 of Fig. 2.

Means is provided for maintaining these brake segments in normally inwardly projected position and in the present instance this is accomplished by forming the U-shaped channel wall members 8 and 9 with registering apertures to receive a pin 21 having a recessed portion 22 to hold in position a leaf spring 23 which has a central ridge 24 which seats in recess 22 of the pin. The opposite free ends 25 of the leaf spring 23 will then rest against the interior portions of each arcuate member 13 of the two adjacent sections. Thus each spring 23 actuates the two adjacent ends of two segments to hold the segments inwardly and normally out of contact with the brake drum D. By reference to Figs. 3 and 6 of the drawings it will be noted that the inflatable tube, the segment and the lining 20 are all nested within the spaced apart walls 8 and 9 of the U-shaped rim 7 and are shifted radially outwardly by means of the inflation of the rubber tube 10 as hereinafter described. The connection for inflating this rubber tube is shown clearly in Figs. 2, 3, 4, and 5 of the drawings wherein the plate portion 6 is perforated to receive the metallic elbow 26 which is suitably connected as at 27 to the rubber inflatable tube. This elbow is rigidly held in position by means of a sleeve 28 surrounding the straight portion 29 of elbow 26, and this sleeve 28 has a radial extension 30. A bolt 31 passes through a suitable opening in plate 6 and rigidly fastens into the lateral sleeve 30. In addition, as shown in Fig. 3, the rubber inflatable tube is provided with a valve 32 to permit filling or emptying of the system as desired. Obviously this valve is of well known construction.

Details of construction of the means for inflating the rubber tubes 10 are shown clearly in Figs. 10, 11, and 12 of the drawings, wherein the rigid housing A incloses the master diaphragm 32 which may be composed of rubber, rubberized fabric, or suitable non-metallic resilient material. This cylindrical casing A is closed at one end by means of a closure 33 which forms a rigid abutment for the end of the inflatable diaphragm 32. This diaphragm connects, as at 34, with an upstanding nipple 35 leading to a four-way connection 36, the four conduits C of which lead to the brakes, as illustrated in Fig. 1. The cap 37 permits the system to be filled with fluid from this point if desired. The opposite end of the metal cylinder A is turned outwardly, as at 38, to provide a guideway and opening in which slides a metal hollow cylinder 39. A metallic bracket is riveted or otherwise fastened as at 40 to the end of the casing A. In addition, a flexible boot 41 made of rubber or fabric is connected to the hollow cylinder 39 as at 42 and to the end 38 of the casing A as at 43. This boot, being flexible, permits the reciprocation of the hollow cylinder 39 as will be hereinafter made evident and at the same time excludes any possibility of dust or dirt entering the cylinder casing A.

The inner end of the hollow cylinder 39 is made of rounded contour as illustrated at 44, and the inner face of this hollow cylinder has riveted thereto a head 45 to provide a socket in which is uniformly mounted a ball 46 on the end of rod 47 which has threaded thereupon, as at 48, an end plate 49 adapted to close the hollow cylinder 39. The outer end of rod 47 is provided with a pivotal connection as at 50 to the brake lever B pivoted at 31. By means of this arrangement when the brake lever B is depressed, rod 47 together with hollow cylinder 39 will be forced into the cylinder casing A, the rounded portion 44 of cylinder 39 pushing inwardly against the rubber diaphragm 32, and since the rigid walls of the casing A do not give the fluid contained within the rubber diaphragm 32 is necessarily forced from the exit 34 through the tubes C to each inflatable tube 10 at a brake, thereby shifting the brake segments radially outwardly and applying the brakes. When the braking operation is over and pressure removed from the pedal, the rod 47 is thrown outwardly by the usual brake spring on the pedal and the fluid in the system returns to the master diaphragm 32, the springs 23 on each brake segment throwing the segments away from the brake drum. It will be at once appreciated that the hereinbefore described system is absolutely a closed, hermetically disposed system wherein the fluid has no access to the atmosphere or air and therefore cannot evaporate. Furthermore, by reason of the absolutely closed nature of the system, no possible leakage or evaporation of the fluid can occur. It will also be evident that by reason of the universal rocking movement provided at the inner end of the rod 47 and its connection to the hollow cylinder 39, a true inward movement against the rubber diaphragm is assured and also by reason of the curved surface of the cylinder 39 and the interengagement of the outer wall of the diaphragm no pinching of this diaphragm 32 can occur during the braking operation.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a device of the class described a brake shoe consisting of arcuate segments of sheet metal, at least one of said segments being formed with spacing lugs adapted to space it from the other segment of the shoe to form a space between the segments to provide an air circulating chamber to dissipate heat.

2. In a device of the class described a brake shoe comprising an inner arcuate sheet metal section and an outer arcuate sheet metal section, at least one of said sections having inwardly bent portions adapted to space said sections apart and to form large air circulating chambers for the dissipation of heat, and a brake lining member secured to the outer arcuate section.

3. In a device of the class described the combination of two members concentrically disposed and capable of relative rotation, means for braking movement therebetween comprising a series of arcuate shoes concentrically disposed between said members, each shoe comprising an inner arcuate flat strip of metal and an outer arcuate flat strip of metal, the outer strip having at its ends inwardly bent, spaced apart tongues with laterally extending lips engaging the flat outer face of the inner arcuate section, an intermediate portion of the outer section being provided with an inwardly folded or bridge portion whereby to form spacing means between said sections for circulating currents of air through said shoes, a recessed pin mounted in perforations in one of said members and extending between the adjacent inwardly turned lugs of the outer portion of the segment of a shoe, a leaf spring lying in the recess of said pin, the free ends of said leaf spring extending through the spaced flanges or lugs formed in the outer section of a shoe and engaging against the inner wall of the inner section of a shoe whereby to force the ends of adjacent shoes inwardly, an inflatable member concentrically mounted adjacent said shoes and means for inflating the member to shift said shoes.

4. In a device of the class described the combination of two concentrically disposed members to be braked, a series of arcuate shoes concentrically disposed between said members, each of said shoes being formed of sheet metal and being hollow to provide air circulating chambers to dissipate heat, the ends of adjacent shoes being slightly spaced apart, pins carried by one of said members and lying between the ends of adjacent shoes, a leaf spring carried by each pin, the free ends of the leaf spring extending into the hollow of each adjacent shoe and engaging a portion thereof to force said shoe inwardly, an inflatable member concentrically disposed within the shoe and means for inflating the member to shift the shoes radially.

5. In a device of the class described the combination with the axle of an automobile the hub and brake drum, a disc attached to a stationary portion of the automobile frame, said disc having at its outer periphery a circumferentially disposed rim having spaced apart walls to provide a U-shaped channel, an inflatable tube and braking segments concentrically disposed in said channel and underlying the brake drum, a metallic elbow passing through said disc and connecting with the inflatable tube, said elbow having a surrounding sleeve provided with a lateral sleeve and a bolt passing through a perforation in said disc and engaging said lateral sleeve whereby to hold said elbow rigidly to said disc, and a fluid pressure connection to said elbow for inflating said inflatable tube.

6. A brake shoe comprising a metal arcuate member, a second metal arcuate member having end lugs bent substantially at right angles and fastened to said first arcuate member, one of said members having intermediate inwardly folded portions forming rigid spacing ribs and intermediate air chambers.

7. A brake shoe comprising a metal arcuate member, a second metal arcuate member having end lugs bent substantially at right angles and fastened to said first arcuate member, one of said members having intermediate inwardly folded portions forming rigid spacing ribs and intermediate air chambers, and an individual brake lining forming a facing for said second arcuate member.

8. A brake shoe comprising an arcuate sheet metal member, a second arcuate sheet metal member having lugs extending therefrom and secured to said first arcuate member whereby to secure said members in spaced relationship, one of said members having intermediate angularly disposed portions engaging the other member to form a spacing rib and an air chamber.

9. A sheet metal brake shoe comprising spaced apart arcuate members, one of said members having inwardly folded integral portions extending to engage the other arcuate member to form rigid spacing ribs and laterally extending air channels between said members.

10. An arcuate brake shoe comprising spaced arcuate members of relatively thin metal stock, at least one of said members having integral offset portions extending to and secured to the other member to maintain the spaced relationship of the member, and a piece of brake lining fastened to the arcuate surface of one of the members on the side thereof remote from the other member.

11. A brake shoe comprising a pair of spaced arcuate members at least one of which has an integral offset portion intermediate its ends which extends to and is secured to the other member to maintain the same in spaced relationship and a piece of brake lining secured to one of said arcuate members.

12. A brake shoe comprising a pair of spaced arcuate members at least one of which has an integral offset portion at one end which extends to and is secured to the other member to maintain the same in spaced relationship and a piece of brake lining secured to one of said arcuate members.

13. A brake shoe comprising a pair of spaced arcuate members at least one of which has integral offset portions at and intermediate its ends which extends to and is secured to the other member to maintain the same in spaced relationship and a piece of brake lining secured to one of said arcuate members.

14. A brake shoe comprising a pair of spaced arcuate members at least one of which has integral offset portions at its ends which extend to and are secured to the other member to maintain the same in spaced relationship and a piece of brake lining secured to one of said arcuate members.

15. A brake shoe comprising a pair of spaced arcuate members at least one of which has an integral offset portion intermediate its ends which extends to and is secured to the other member to maintain the same in spaced relationship and at least one of which has an offset portion at one end which extends to and is secured to the other member and a piece of brake lining secured to one of said arcuate members.

BERT A. LINDERMAN.